E. BUGATTI.
SHOCK ABSORBER.
APPLICATION FILED JUNE 3, 1914.
1,133,093.
Patented Mar. 23, 1915.
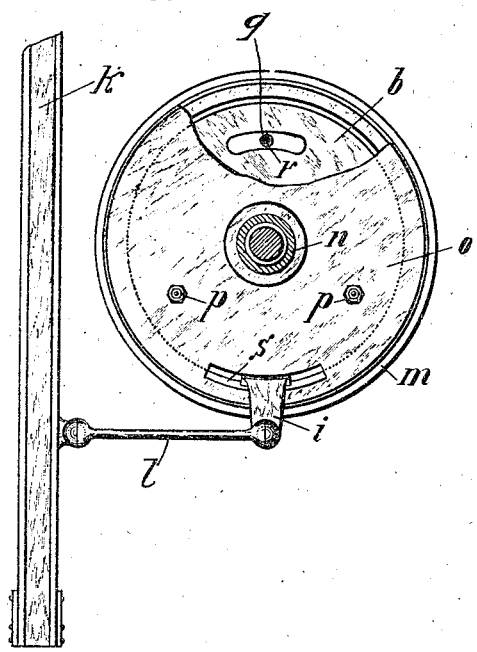
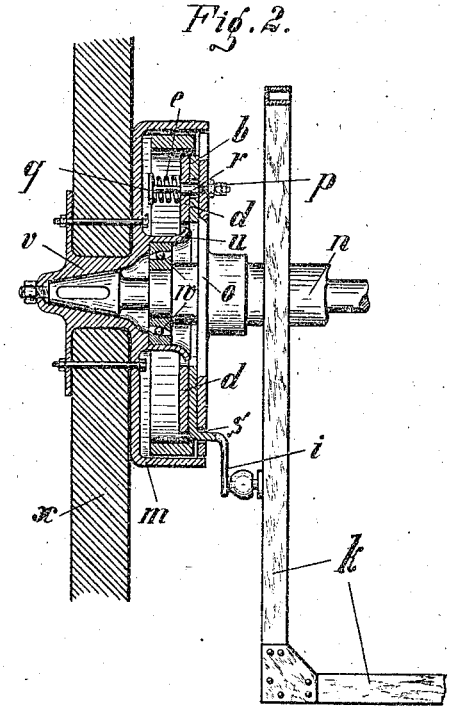
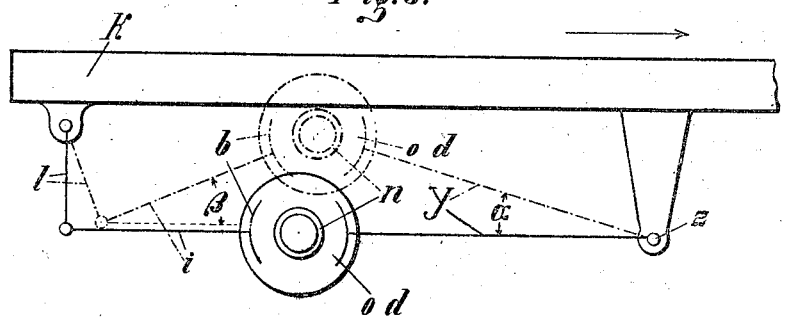
Witnesses:—
Inventor:—
Ettore Bugatti
by his attorney

UNITED STATES PATENT OFFICE.

ETTORE BUGATTI, OF MOLSHEIM, GERMANY.

SHOCK-ABSORBER.

1,133,093.  Specification of Letters Patent.  Patented Mar. 23, 1915.

Application filed June 3, 1914. Serial No. 842,752.

*To all whom it may concern:*

Be it known that I, ETTORE BUGATTI, a subject of the King of Italy, and residing at Molsheim, Alsace, German Empire, have invented certain new and useful Improvements in Shock-Absorbers, of which the following is a specification.

The present invention has reference to improvements in shock absorbers, such as are extensively used in automobiles and like vehicles, and relates more particularly to a novel disposition of the shock absorber within the rear wheel brake drum, coaxially therewith. The shock absorber in this position is protected against injury and dirt and is automatically lubricated by the waste oil from the wheel bearing; and furthermore a favorable damping effect is obtained even when only relatively small irregularities in the road are negotiated. In this new arrangement, by the coöperation of two lever arms, the frictional resistance is considerably enhanced over the ordinary construction of shock absorber, and a sudden, bumping action on the main suspension springs, upon the brakes being suddenly set, is obviated.

In order to make my invention more readily understood, I will now describe it with reference to the accompanying drawings, in which—

Figure 1 shows a side elevation of the rear axle drum containing the shock absorber, with chassis connection. Fig. 2 represents a sectional elevation therethrough, and Fig. 3 a diagram, illustrating the operation.

The friction disk $b$ of the shock absorber is located in the rear wheel brake drum $m$ and coöperates with its one face with the drum cover plate $o$, fast on the dead axle $n$, and with its other face with the pressure disk $d$ which is under the pressing influence of the springs $e$. These latter surround the axially displaceable disk bolts $q$ and their tension can be altered by manipulating the nuts $p$, threading on the outer ends of the bolts, which latter pass loosely through the sleeve bolts $r$ on which the friction disk $b$ is supported with limited oscillatory displacement. The arm $i$, which may be in one with the friction disk $b$ or is otherwise rigidly secured thereto, extends through a slot $s$ in the cover plate $o$, and its free end is pivotally connected to a rod $l$, linked to the chassis $k$, as shown in Fig. 1. The tubular extension $u$ of the wheel hub $v$ receives the roller bearing $w$ of the rear wheel $x$ and is flared at the outer circumferential edge, for the purpose of conducting the lubricant, issuing from the roller bearing, to the friction parts of the shock absorber.

According to the diagram of Fig. 3, the rear wheel dead axle $n$ can oscillate about the fixed universal joint $z$ by means of the Cardan shaft tube or the stays $y$. Similarly, the arm $i$, rigidly connected to the friction disk $b$, is pivotally connected to the chassis $k$ by means of the link $l$. By this arrangement there is obtained a simultaneous, oppositely directed displacement of the friction members, relative to one another, the member $i$ turning for instance through an angle $б$, and the parts $o$, $d$ through an angle $α$, so that relatively extended friction distances are traversed.

What I claim is:—

1. In an autovehicle in combination with the chassis and the running gear, a brake drum on the rear wheel, a wheel hub forming a part of the drum, a flared tubular extension extending into the drum, a shock absorber housed by the drum, said tubular extension adapted to direct waste oil from the wheel to the shock absorber.

2. In an autovehicle in combination with the chassis and the running gear, a brake drum on the running gear, a shock absorber of the friction disk type, housed by the drum, and means forming a part of the wheel hub extending into the drum and terminating in proximity to the shock absorber for directing waste oil from the wheel to the shock absorber.

3. In an autovehicle, in combination with the chassis and the running gear, a brake drum on the rear wheel axle, and a shock absorber of the friction disk type extending into said drum coaxial therewith, adapted to be lubricated by the waste oil from the wheel bearing.

In testimony whereof I affix my signature in presence of two witnesses.

ETTORE BUGATTI.

Witnesses:
 JOSEPH ROHMER,
 CHARLES A. HALLEY, Jr.